United States Patent

Slabakov

[15] 3,679,261
[45] July 25, 1972

[54] AUTOMOBILE SEAT BACK

[72] Inventor: Christo G. Slabakov, 5803 Doral Apts., Bldg. #58, Cornwells Heights, Pa. 19020

[22] Filed: April 3, 1970

[21] Appl. No.: 25,311

[52] U.S. Cl. ............................................297/231, 297/453
[51] Int. Cl. ..........................................................A47c 7/02
[58] Field of Search ...........................297/230, 231, 453, 254

[56] References Cited

UNITED STATES PATENTS

| 2,059,597 | 11/1936 | Okano | 297/453 |
| 2,659,420 | 11/1953 | Burke | 297/231 |

FOREIGN PATENTS OR APPLICATIONS

| 528,013 | 6/1955 | Italy | 297/231 |
| 603,373 | 4/1960 | Italy | 297/230 |
| 1,064,360 | 8/1959 | Germany | 297/453 |
| 1,156,793 | 5/1958 | France | 297/231 |

*Primary Examiner*—James C. Mitchell
*Attorney*—Gene W. Francis

[57] ABSTRACT

A device is disclosed for fitting over the back of an automobile seat. The device when used provides increased lateral stability to the driver or passenger of an automobile and in addition supports the person against the webbing, away from the fabric of the seat itself, thereby providing a certain cooling effect. The device includes an elliptical frame having a hanger member attached to the rear thereof for hooking over the back of a seat. Resilient strips connected to either side and the top and bottom of the elliptical frame are woven together to form a webbing against which a users back rests.

1 Claim, 5 Drawing Figures

PATENTED JUL 25 1972

INVENTOR
CHRISTO G. SLABAKOV

ATTORNEY

INVENTOR
CHRISTO G. SLABAKOV

ATTORNEY understand# AUTOMOBILE SEAT BACK

BACKGROUND OF THE INVENTION

This invention relates to a device for increasing the comfort and safety of an automobile operator or passenger. The device is primarily useful in that it provides increased lateral stability for a person using a car having either straight-backed or semi-bucket seats. In addition to this function a second primary advantage of the seat back of this invention is that the person using the seat back is supported away from the fabric of the seat itself with his back resting against a webbing whereby air is allowed to pass between the seat back and the seat itself, thus providing a substantial cooling effect. In addition to the above, the seat back of this invention is designed such that substantial support is given to the user thereof in the small of his back, thus causing the spine to be supported in an upright manner which has been found to be much less tiring than the normal position assumed in an automobile seat.

SUMMARY OF THE INVENTION

The seat back of the present invention comprises basically an elliptical frame of a substantially rigid material. Suitable material for this purpose has been found to be a steel tubing which can be formed in the desired shape in manufacture and is not easily distorted thereafter. A secondary supporting member is attached to one side of the elliptical frame and extends outwardly in the form of a hook therefrom for engaging the top of an automobile seat and supporting the seat back in place. This secondary supporting member is suitably of the same material forming the elliptical frame but need not be of as large a diameter as less forces are applied to this supporting member than to the frame itself. In the preferred embodiment both the elliptical frame and the supporting member are covered in a soft pliable material, such as a self-curing latex or a plastic material that can be wrapped about the member, to provide a pleasing appearance and additional comfort in use.

In the preferred embodiment, the elliptical frame is wrapped with a flat, plastic, strip material and the supporting member is caused to conform to a certain portion of the length thereof and is attached to the frame by wrapping the plastic stripping around the concurrent portions of the frame and support.

A web is suspended within the circumference of the elliptical frame for providing support to the back of a person using the device. The web is suitable formed of the plastic stripping concurrently with wrapping the elliptical frame. Preferably, the plastic stripping is resilient whereby the web is made taut as it is formed.

The seat back of the present invention and the many objects and attendant advantages thereof will become more easily understood and apparent upon reference to the following detailed description of a preferred embodiment of the device when reviewed together with the accompanying drawing wherein like reference numerals denote like parts.

DESCRIPTION OF THE PREFERRED EMBODIMENT

Figure 1:
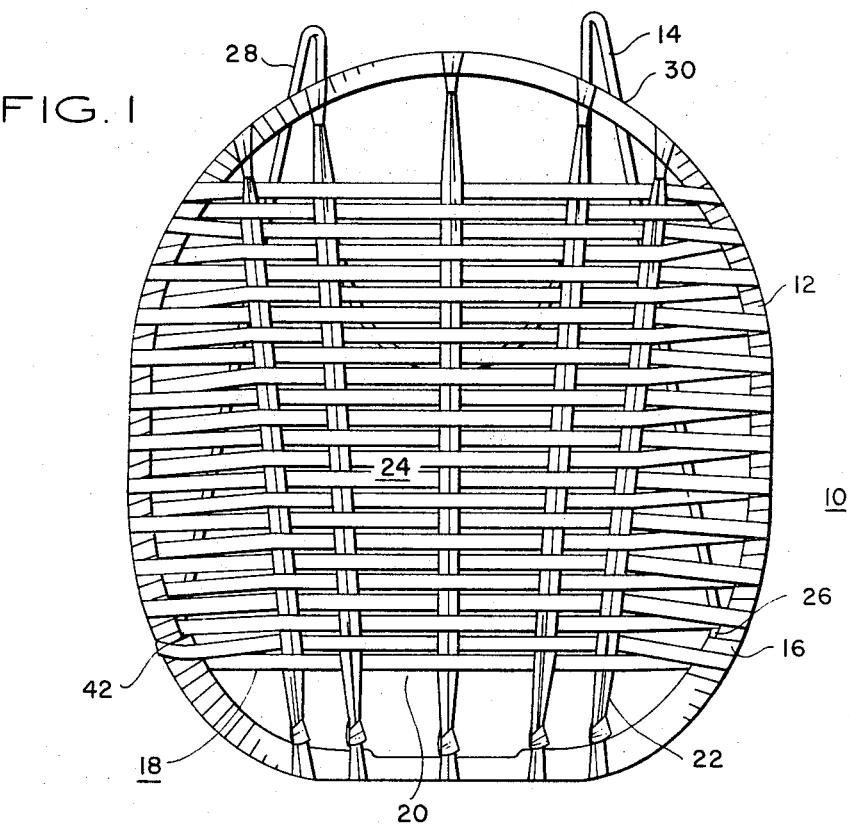
FIG. 1 is a plan view of the seat back of the present invention showing the webbing suspended within the circumference of the elliptical frame member.

Referring again to FIG. 1 of the drawing, a seat back in accordance with the present invention is shown denoted generally by the reference numeral 10. The seat back comprises generally an elliptical frame 12 to which is connected a supporting member 14 for fitting over the top of an automobile seat and supporting the seat back in position with relation to the seat. The elliptical frame 12 is wrapped with a resilient stripping material 16, preferably a soft plastic, from which a webbing, denoted generally by the reference numeral 18 is formed suspended from the circumference of the frame 12. It will be noted that the webbing 18 is woven by inter-crossing the horizontal strips 20 with vertical strips 22. Preferably the webbing is drawn tight as it is woven to provide a taut planar surface, 24, against which a person's back is supported when the device is employed.

Figure 3:
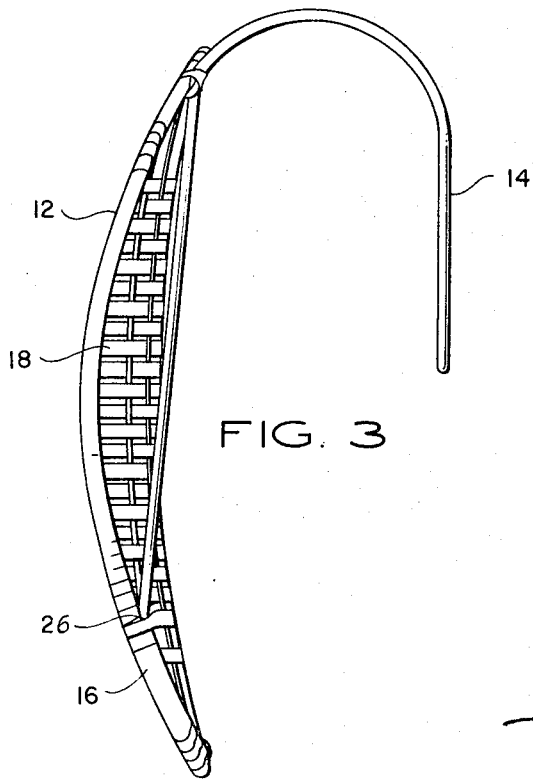
FIG. 3 is a side view of the device shown in FIG. 1.

Referring to FIG. 3 it may be seen that the supporting member 14 is attached to the frame 12 at each of its lower ends thereof 26 by the expediency of concurrently wrapping the frame and adjacent lower ends 26 of the supporting member 14 with the stripping 16. By having a certain portion of the lower ends of the supporting member 14 conform to the circumference of the frame 12 a firm bond is made between the frame and supporting member ends by the webbing.

It will also be noted that the upper portion of the supporting member 14 is attached to the top of the frame 12 at points 28 and 30 in a like manner by wrapping the adjacent portions of the frame and supporting member together with the stripping 16.

Figure 2:
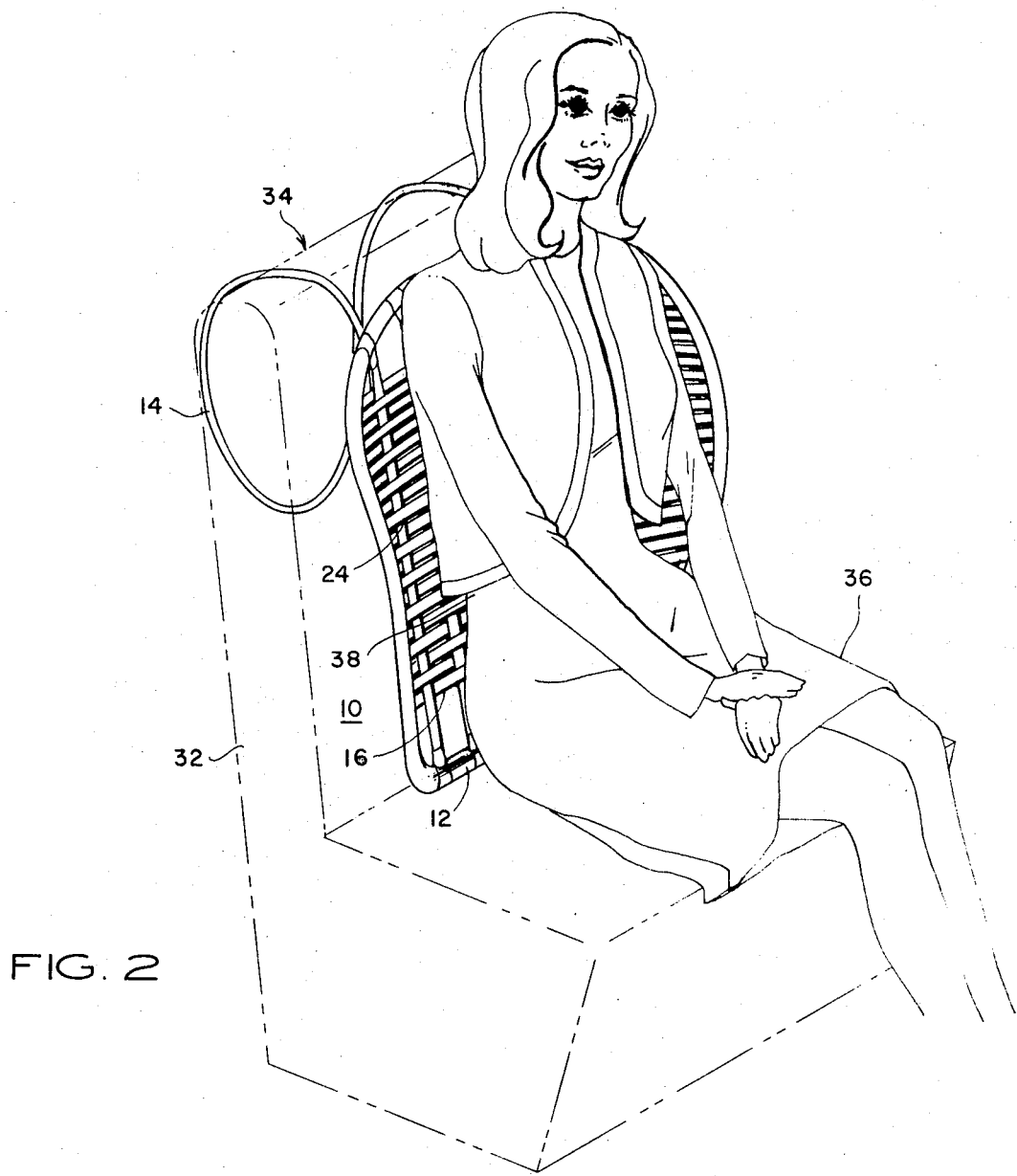
FIG. 2 is a pictorial view showing the seat back suspended over an automobile seat and the placement of the seat back in relation to a person using same.
Figure 4:
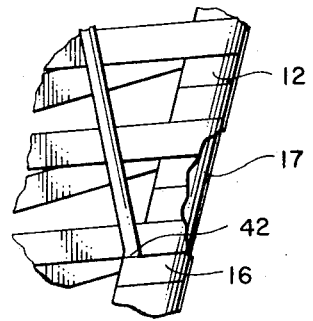
FIG. 4 is a breakaway view of the structure shown in FIG. 3 showing the method of attachment of the lower ends of the supporting member to the frame.
Figure 5:
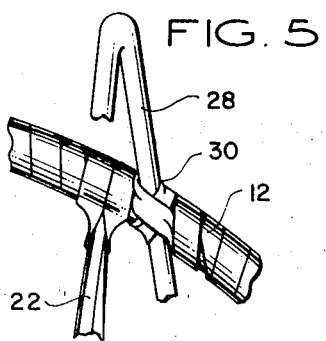
FIG. 5 is a breakaway view of the structure shown in FIG. 1 showing the method of attachment of the upper portion of the supporting member to the frame.

FIG. 2 shows the seat back of the present invention 10 employed over the upright portion of an automobile seat 32. The seat back 10 is positioned by hooking the supporting member 14 over the top 34 of the seat 32 and allowing the seat back to hang down against the front of the upright portion of the seat 32. It will be noted here that the supporting member 14 is formed of a somewhat malleable material such that it can be bent by a user to adapt to various forms of seats.

FIG. 2 also served to illustrate the placement of the seat back 10 between the upright portion of the seat 32 and a person 36 sitting on the automobile seat and leaning back against the seat back 10. It will be noted that the sides of the elliptical frame serve to provide lateral stability to a person employing the seat back and the person's back is supported away from the automobile seat 32 against the plane formed by the webbing 24. It will also be noted here that the sides of the elliptical frame are curved outwardly from the seat to give added support to the small of the back and to provide the aforementioned lateral stability.

One of the primary advantages of the seat back of the present invention will become readily apparent from viewing its use as shown in FIG. 2. The person's back 38 is supported well away from the fabric of the seat 32 against the plane 24 formed by the webbing 16. Thus, an air space is provided between the back of the upright seat 32 and the person's back 38. Because of the many air spaces provided by the webbing, air is free to circulate against the person's back for greater comfort when traveling in the automobile.

It will also be noted that the seat back is readily hung from or detached from the automobile seat and may be readily employed or detached and stored in the trunk with ease.

It will also be noted from the drawing of FIG. 2 that because of the shape of the frame member 12 the webbing 16 causes the person using the device to be supported in an upright manner whereby the spine is substantially vertical. It has been found that when the device of the present invention is employed in an automobile having straight-backed seats or semi-bucket seats the driver or passenger using the seat back grows much less tired on extended trips. In addition, because of the lateral stability afforded the user he is much less apt to slide sideways or at least have to control himself to keep from sliding sideways as the automobile is turned either right or left, thus reducing the tiring strain of long automobile trips.

While this invention has been described with reference to a particular embodiment thereof, it is understood that other embodiments and modifications of those embodiments herein disclosed will become readily apparent to those persons skilled in the art upon reference to the foregoing description. It is, therefore, contemplated that all such modifications and embodiments will be covered by the appended claims.

What is claimed is:
1. An automobile seat back comprising:
  a. a rigid elliptical frame member, the sides of which bow outwardly away from an automobile seat in a concave manner;
  b. a unitary supporting member;
  c. a single elongated plastic strip concurrently wrapping around said frame member, and inter-crossing between opposed sides thereof to form a webbing of inter-crossed horizontal and vertical strips and wrapping said frame member and the end portions of said supporting member to form a bond between said frame and said supporting member and further wrapping said supporting member.

* * * * *